US012480449B2

(12) United States Patent
Kumar et al.

(10) Patent No.: US 12,480,449 B2
(45) Date of Patent: Nov. 25, 2025

(54) PROPULSION SYSTEM INCLUDING AN ELECTRIC MACHINE FOR STARTING A GAS TURBINE ENGINE

(71) Applicant: General Electric Company, Schenectady, NY (US)

(72) Inventors: Vinod Kumar, Bengaluru (IN); Shankar Jayaraman, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/081,185

(22) Filed: Dec. 14, 2022

(65) Prior Publication Data

US 2024/0060452 A1 Feb. 22, 2024

(30) Foreign Application Priority Data

Aug. 22, 2022 (IN) ............................ 202211047645

(51) Int. Cl.

| | |
|---|---|
| ***F02C 7/268*** | (2006.01) |
| ***F02C 7/36*** | (2006.01) |
| *B64D 27/02* | (2006.01) |
| *F01D 15/10* | (2006.01) |
| *F02C 6/00* | (2006.01) |

(52) U.S. Cl.

CPC ................ *F02C 7/268* (2013.01); *F02C 7/36* (2013.01); *B64D 27/026* (2024.01); *F01D 15/10* (2013.01); *F02C 6/00* (2013.01); *F05D 2220/76* (2013.01); *F05D 2260/85* (2013.01)

(58) Field of Classification Search

CPC ...................................................... F02C 7/268

See application file for complete search history.

(56) References Cited

U.S. PATENT DOCUMENTS

| | | | |
|---|---|---|---|
| 608 | A | 2/1838 | Moon |
| 1,208 | A | 6/1839 | Burt et al. |
| 2,626,501 | A | 1/1953 | Pavlecka et al. |
| 3,673,802 | A | 7/1972 | Krebs et al. |

(Continued)

FOREIGN PATENT DOCUMENTS

| | | | |
|---|---|---|---|
| CN | 101652535 | A | 2/2010 |
| CN | 103228872 | A | 7/2013 |

(Continued)

OTHER PUBLICATIONS

Carney et al., Weight Assessment for Fuselage Shielding on Aircraft With Open-Rotor.Engines and Composite Blade Loss, NASA/TM-2013-216582, 2013, 33 Pages.

(Continued)

*Primary Examiner* — Katheryn A Malatek
(74) *Attorney, Agent, or Firm* — Dority & Manning, P.A.

(57) ABSTRACT

A gas turbine engine includes a turbomachine comprising a low pressure (LP) spool and a high pressure (HP) spool that rotate about a central axis, an electric motor mechanically coupled to the LP spool for selectively rotating the LP spool, a starter assembly mechanically coupled to the HP spool for selectively rotating the HP spool, and a controller in operative communication with the electric motor and the starter assembly, the controller being configured to operate the electric motor to rotate the LP spool and operate the starter assembly to rotate the HP spool during engine startup.

17 Claims, 7 Drawing Sheets

(56) References Cited

U.S. PATENT DOCUMENTS 3,688,505 A 9/1972 Dison
3,729,957 A 5/1973 Petrie et al.
3,835,641 A 9/1974 Goodrich
3,997,131 A 12/1976 Kling
4,246,531 A 1/1981 Jordan
4,534,526 A 8/1985 Metzger et al.
4,615,008 A 9/1986 Rosenbush et al.
4,625,280 A 11/1986 Couch
4,635,771 A 1/1987 Shoji et al.
4,751,816 A 6/1988 Perry
4,792,906 A 12/1988 King et al.
4,809,500 A 3/1989 Roberts, Jr.
4,896,499 A 1/1990 Rice
4,909,031 A 3/1990 Grieb
4,917,336 A 4/1990 Jacobs et al.
4,934,825 A 6/1990 Martin
4,936,748 A 6/1990 Adamson et al.
4,976,102 A 12/1990 Taylor
5,010,729 A 4/1991 Adamson et al.
5,090,193 A 2/1992 Schwarz et al.
5,148,402 A 9/1992 Magliozzi et al.
5,156,353 A 10/1992 Gliebe et al.
5,190,441 A 3/1993 Murphy et al.
5,197,855 A 3/1993 Magliozzi et al.
5,325,042 A 6/1994 Murugan
5,349,814 A 9/1994 Ciokajlo et al.
5,432,383 A 7/1995 Kawamura
5,574,647 A 11/1996 Liden
5,694,765 A 12/1997 Hield et al.
5,789,678 A 8/1998 Pla
5,951,608 A 9/1999 Osder
6,000,215 A 12/1999 Roberts, Jr.
6,012,676 A 1/2000 Gold et al.
6,341,747 B1 1/2002 Schmidt et al.
6,385,959 B1 5/2002 Montoya
6,467,725 B1 10/2002 Coles et al.
6,474,603 B1 11/2002 Kinkead et al.
6,704,625 B2 3/2004 Albero et al.
6,936,947 B1 8/2005 Leijon et al.
6,979,979 B2 12/2005 Xu et al.
7,063,505 B2 6/2006 Czachor
7,296,409 B2 11/2007 Spooner
7,328,577 B2 2/2008 Stewart et al.
7,513,120 B2 4/2009 Kupratis
7,552,582 B2 6/2009 Eick et al.
7,578,132 B2 8/2009 Webster
7,635,922 B2 12/2009 Becker
7,690,205 B2 4/2010 Delaloye et al.
7,788,898 B2 9/2010 Kern et al.
7,791,235 B2 9/2010 Kern et al.
7,819,625 B2 10/2010 Merrill et al.
7,832,193 B2 11/2010 Orlando et al.
7,878,005 B2 2/2011 Bradbrook et al.
7,916,311 B2 3/2011 Corn et al.
7,926,287 B2 4/2011 Ullyott et al.
7,937,927 B2 5/2011 Suciu et al.
7,973,422 B2 7/2011 Colin et al.
7,975,465 B2 7/2011 Morris et al.
8,010,250 B2 8/2011 Borumand et al.
8,011,613 B2 9/2011 Belleville
8,039,983 B2 10/2011 Cote et al.
8,061,968 B2 11/2011 Merry et al.
8,083,482 B2 12/2011 Serven et al.
8,087,607 B2 1/2012 Moore et al.
8,109,464 B2 2/2012 Bhargava
8,112,983 B2 2/2012 Bradbrook et al.
8,177,474 B2 5/2012 Andarawis et al.
8,186,617 B2 5/2012 Llamas Sandin
8,191,352 B2 6/2012 Schilling
8,196,860 B2 6/2012 Gall et al.
8,201,414 B2 6/2012 Haehner et al.
8,210,798 B2 7/2012 Stern
8,220,586 B2 7/2012 Todorovic
8,240,609 B2 8/2012 Parazzoli et al.
8,271,151 B2 9/2012 Hasan et al.
8,311,687 B2 11/2012 Bakker
8,313,279 B2 11/2012 Mollmann
8,350,398 B2 1/2013 Butt
8,365,510 B2 2/2013 Lugg
8,375,695 B2 2/2013 Schilling et al.
8,549,833 B2 10/2013 Hyde et al.
8,550,397 B2 10/2013 Verde Preckler et al.
8,561,413 B2 10/2013 Taneja
8,615,335 B2 12/2013 Couey et al.
8,636,241 B2 1/2014 Lugg et al.
8,645,009 B2 2/2014 Klooster
8,661,781 B2 3/2014 Moore et al.
8,678,754 B2 3/2014 Morgan et al.
8,684,314 B2 4/2014 Chaduc et al.
8,690,106 B1 4/2014 Reissig
8,713,946 B2 5/2014 Botarelli
8,825,342 B2 9/2014 Schaeffer et al.
8,904,972 B2 12/2014 Kumar et al.
8,955,335 B2 2/2015 Burns
8,967,967 B2 3/2015 Stretton et al.
9,008,942 B2 4/2015 Dyrla et al.
9,017,028 B2 4/2015 Fabre
9,045,996 B2 6/2015 Anghel et al.
9,051,881 B2 6/2015 Bettner
9,057,329 B2 6/2015 Weir et al.
9,063,030 B2 6/2015 Slemp
9,102,397 B2 8/2015 Wood
9,109,517 B2 8/2015 Banaerjee et al.
9,140,195 B2 9/2015 Botarelli
9,146,545 B2 9/2015 Stewart
9,157,372 B2 10/2015 Sowden
9,174,741 B2 11/2015 Suntharalingam et al.
9,176,024 B2 11/2015 Jensen et al.
9,193,479 B2 11/2015 Moy et al.
9,200,591 B2 12/2015 Du et al.
9,200,592 B2 12/2015 Berryann et al.
9,209,721 B2 12/2015 Solodovnik et al.
9,221,535 B2 12/2015 Gordon et al.
9,248,908 B1 2/2016 Luyks
9,260,195 B2 2/2016 Oyori et al.
9,322,280 B2 4/2016 Funk et al.
9,328,661 B2 5/2016 Ho et al.
9,387,934 B2 7/2016 Gomez
9,395,270 B2 7/2016 Czerniak et al.
9,416,820 B2 8/2016 Ertas et al.
9,422,906 B2 8/2016 Kees et al.
9,428,267 B2 8/2016 DeVita et al.
9,429,078 B1 8/2016 Crowe et al.
9,446,842 B2 9/2016 Luyks
9,488,109 B2 11/2016 Sowden
9,527,578 B2 12/2016 Towkan
9,540,094 B2 1/2017 Negulescu et al.
9,564,056 B1 2/2017 Ghaemi et al.
9,611,788 B2 4/2017 Sidelkovskiy
9,664,070 B1 5/2017 Clauson et al.
9,725,155 B2 8/2017 Miller et al.
9,745,051 B2 8/2017 Tantot et al.
9,758,254 B2 9/2017 Moore et al.
9,789,768 B1 10/2017 Meier
9,856,745 B2 1/2018 Ali
9,890,657 B2 2/2018 Ali
10,006,375 B1 6/2018 Wagner et al.
10,072,581 B2 9/2018 Waissi et al.
10,118,710 B2 11/2018 Derrez et al.
10,131,441 B2 11/2018 Edwards et al.
10,196,923 B2 2/2019 Thomassin
10,202,865 B2 2/2019 Breeze-Stringfellow et al.
10,352,247 B2 7/2019 Sheridan et al.
10,370,086 B2 8/2019 Vion et al.
10,378,452 B1 8/2019 Barmichev et al.
10,399,664 B2 9/2019 Bowden et al.
10,408,133 B2 9/2019 Wintgens et al.
10,414,486 B2 9/2019 Wood et al.
10,644,630 B2 5/2020 Smith et al.
10,696,416 B2 6/2020 Gansler et al.
10,800,536 B2 10/2020 Wagner et al.
10,837,304 B2 11/2020 Vondrell et al.
10,998,837 B2 5/2021 Smith et al.
11,008,883 B2 5/2021 Zatorski et al.

(56) References Cited

U.S. PATENT DOCUMENTS 11,041,462 B2 6/2021 Kupratis et al.
11,162,429 B2 11/2021 Oyama et al.
2001/0024075 A1 9/2001 Caamano
2002/0122723 A1 9/2002 Care et al.
2002/0142208 A1 10/2002 Keefer et al.
2003/0143448 A1 7/2003 Keefer
2003/0176223 A1 9/2003 Aoki
2005/0056021 A1 3/2005 Belokon et al.
2005/0189772 A1 9/2005 Gozdawa
2006/0005544 A1 1/2006 Herlihy
2006/0042252 A1 3/2006 Derouineau
2006/0087123 A1 4/2006 Stout et al.
2006/0168968 A1* 8/2006 Zielinski ................ F02C 7/277 60/778
2008/0006739 A1 1/2008 Mochida et al.
2008/0138195 A1 6/2008 Kern et al.
2008/0149445 A1 6/2008 Kern et al.
2008/0174194 A1 7/2008 Qu et al.
2008/0184906 A1 8/2008 Kejha
2008/0245925 A1 10/2008 Udall
2008/0276620 A1 11/2008 Ullyott et al.
2009/0145136 A1 6/2009 Norris et al.
2010/0058731 A1 3/2010 Haehner et al.
2010/0083632 A1 4/2010 Foster et al.
2010/0107652 A1 5/2010 Hyde et al.
2010/0127496 A1 5/2010 Burkholder et al.
2010/0133835 A1 6/2010 Dooley et al.
2010/0154384 A1 6/2010 Schilling
2010/0219779 A1* 9/2010 Bradbrook ............... F02C 7/32 60/773
2010/0251726 A1 10/2010 Jones et al.
2010/0327589 A1 12/2010 Macchia
2011/0243735 A1 10/2011 Balk et al.
2012/0017602 A1 1/2012 Hansen et al.
2012/0167590 A1 7/2012 Bettner
2012/0177493 A1 7/2012 Fabre
2012/0195739 A1 8/2012 Kingan
2012/0201657 A1 8/2012 Donnelly et al.
2012/0209456 A1 8/2012 Harmon et al.
2012/0221157 A1 8/2012 Finney et al.
2013/0000317 A1 1/2013 Berryann et al.
2013/0000323 A1 1/2013 Kupratis
2013/0064685 A1 3/2013 Cheng et al.
2013/0076120 A1 3/2013 Wagner et al.
2013/0081406 A1 4/2013 Malmborg et al.
2013/0115083 A1 5/2013 Vuillemin
2013/0133480 A1 5/2013 Donnelly
2013/0139519 A1 6/2013 Kesseli et al.
2013/0147192 A1 6/2013 Condon et al.
2013/0205794 A1 8/2013 Xu
2013/0233977 A1 9/2013 Smiley et al.
2013/0234506 A1 9/2013 Langford et al.
2013/0247539 A1 9/2013 Hoppe
2013/0250794 A1 9/2013 Kusano et al.
2013/0277976 A1 10/2013 Koenig
2013/0292941 A1 11/2013 Mountain et al.
2013/0327014 A1 12/2013 Moulebhar
2013/0340521 A1 12/2013 Clark et al.
2014/0117894 A1 5/2014 Huang et al.
2014/0150401 A1 6/2014 Venter
2014/0248116 A1 9/2014 Ali
2014/0338352 A1 11/2014 Edwards et al.
2014/0352320 A1 12/2014 Nanataki et al.
2015/0035286 A1 2/2015 Stephens
2015/0098792 A1 4/2015 Doebbeling et al.
2015/0100180 A1 4/2015 Oyori et al.
2015/0100181 A1 4/2015 Strauss et al.
2015/0142216 A1 5/2015 Tillman et al.
2015/0244296 A1 8/2015 Edwards
2015/0274306 A1 10/2015 Sheridan
2015/0284071 A1 10/2015 Veilleux, Jr. et al.
2015/0285165 A1 10/2015 Steinwandel et al.
2015/0291276 A1 10/2015 Zatorski et al.
2015/0330300 A1 11/2015 Suciu et al.
2015/0337677 A1 11/2015 Roberge
2015/0344127 A1 12/2015 Wood et al.
2015/0345426 A1 12/2015 Houston et al.
2015/0367950 A1 12/2015 Rajashekara et al.
2015/0377052 A1 12/2015 Hill et al.
2016/0010487 A1 1/2016 Breeze-Stringfellow et al.
2016/0018961 A1 1/2016 Williams
2016/0023773 A1 1/2016 Himmelmann et al.
2016/0047303 A1 2/2016 Davidson et al.
2016/0047307 A1 2/2016 Williamson et al.
2016/0047309 A1 2/2016 Davidson et al.
2016/0075224 A1 3/2016 Miu et al.
2016/0091061 A1 3/2016 Erjavec et al.
2016/0102679 A1 4/2016 Iwrey
2016/0105078 A1 4/2016 Santini et al.
2016/0109133 A1 4/2016 Edwards et al.
2016/0130970 A1 5/2016 Blazer et al.
2016/0149469 A1 5/2016 Lemmers et al.
2016/0160867 A1 6/2016 Gehlot
2016/0164372 A1 6/2016 Zehnle
2016/0177769 A1 6/2016 Iwrey
2016/0177770 A1 6/2016 Adams et al.
2016/0177819 A1 6/2016 Schwarz et al.
2016/0194087 A1 7/2016 Nalim
2016/0221684 A1 8/2016 Ho et al.
2016/0252015 A1 9/2016 Kusumi et al.
2016/0257416 A1* 9/2016 Himmelmann ........ B64D 27/02
2016/0304211 A1 10/2016 Swann
2016/0325629 A1 11/2016 Siegel et al.
2016/0325830 A1 11/2016 Waltner et al.
2016/0333729 A1 11/2016 Miller et al.
2016/0333734 A1 11/2016 Bowden et al.
2016/0340051 A1 11/2016 Edwards et al.
2016/0355272 A1 12/2016 Moxon
2016/0356225 A1 12/2016 Sheridan
2016/0359324 A1 12/2016 Knowles et al.
2016/0368363 A1 12/2016 Petersen et al.
2016/0368592 A1 12/2016 Szymandera
2016/0376981 A1 12/2016 Ullyott et al.
2017/0002688 A1 1/2017 Beutin et al.
2017/0002744 A1 1/2017 Poumarede et al.
2017/0022899 A1 1/2017 Schwarz et al.
2017/0029131 A1 2/2017 Steinwandel et al.
2017/0044989 A1 2/2017 Gemin et al.
2017/0057650 A1 3/2017 Walter-Robinson
2017/0058785 A1 3/2017 Laskowski
2017/0096233 A1 4/2017 Mercier-Calvairac et al.
2017/0114665 A1 4/2017 Gemin et al.
2017/0138272 A1 5/2017 Kusumi et al.
2017/0141648 A1 5/2017 Chong et al.
2017/0159571 A1 6/2017 Sidelkovskiy
2017/0159577 A1 6/2017 Hino et al.
2017/0159665 A1 6/2017 Bergamini et al.
2017/0190435 A1 7/2017 Kobayashi et al.
2017/0190441 A1* 7/2017 Mackin .................. F01D 15/10
2017/0211484 A1 7/2017 Sheridan
2017/0225773 A1 8/2017 Wood et al.
2017/0226934 A1 8/2017 Robic et al.
2017/0234237 A1 8/2017 Pech et al.
2017/0247114 A1 8/2017 Moulon et al.
2017/0274992 A1 9/2017 Chretien
2017/0276024 A1 9/2017 Diwinsky et al.
2017/0285677 A1 10/2017 Converse et al.
2017/0292400 A1 10/2017 Bifulco
2017/0298330 A1 10/2017 Sato et al.
2017/0298816 A1 10/2017 Razak et al.
2017/0306980 A1 10/2017 Tsuji et al.
2017/0320584 A1 11/2017 Menheere
2017/0335774 A1 11/2017 Moniz et al.
2018/0003072 A1 1/2018 Lents et al.
2018/0030944 A1 2/2018 Raad
2018/0065727 A1 3/2018 Gruber et al.
2018/0065743 A1 3/2018 Vondrell et al.
2018/0079492 A1 3/2018 Seidel et al.
2018/0087396 A1 3/2018 van der Merwe et al.
2018/0127084 A1 5/2018 Tajan et al.
2018/0127104 A1 5/2018 Kobayashi et al.
2018/0131250 A1 5/2018 Jewell et al.
2018/0142662 A1 5/2018 Dal et al.
2018/0187595 A1 7/2018 Apte et al.

(56) References Cited

U.S. PATENT DOCUMENTS

| | | | |
|---|---|---|---|
| 2018/0187627 | A1 | 7/2018 | Apte et al. |
| 2018/0209350 | A1 | 7/2018 | Kupratis et al. |
| 2018/0230912 | A1 | 8/2018 | Hasel et al. |
| 2018/0231023 | A1 | 8/2018 | Gentry et al. |
| 2018/0252158 | A1 | 9/2018 | Malkamaki et al. |
| 2018/0278102 | A1 | 9/2018 | Shirokov |
| 2018/0342917 | A1 | 11/2018 | Hunter et al. |
| 2018/0354632 | A1* | 12/2018 | Hon ...................... B64D 31/06 |
| 2018/0354634 | A1 | 12/2018 | Jodet et al. |
| 2019/0003397 | A1 | 1/2019 | Gansler et al. |
| 2019/0006879 | A1 | 1/2019 | Raffaelli et al. |
| 2019/0010869 | A1 | 1/2019 | Kerth |
| 2019/0013722 | A1 | 1/2019 | Yu |
| 2019/0052206 | A1 | 2/2019 | Noderer |
| 2019/0052208 | A1 | 2/2019 | Noderer |
| 2019/0063261 | A1 | 2/2019 | Varney et al. |
| 2019/0078688 | A1 | 3/2019 | Walker et al. |
| 2019/0085715 | A1* | 3/2019 | van der Merwe ...... F02C 3/067 |
| 2019/0131902 | A1 | 5/2019 | Ciciriello et al. |
| 2019/0136768 | A1 | 5/2019 | Harvey |
| 2019/0145322 | A1 | 5/2019 | Sellick et al. |
| 2019/0195081 | A1 | 6/2019 | Kim |
| 2019/0211749 | A1 | 7/2019 | Rodrigues |
| 2019/0271267 | A1 | 9/2019 | Husband et al. |
| 2019/0280583 | A1 | 9/2019 | Nagafuchi et al. |
| 2019/0353104 | A1 | 11/2019 | Kupratis et al. |
| 2019/0368424 | A1 | 12/2019 | Kupratis et al. |
| 2019/0382121 | A1 | 12/2019 | Schwarz et al. |
| 2019/0383157 | A1 | 12/2019 | Kupratis et al. |
| 2020/0023982 | A1 | 1/2020 | Kupratis et al. |
| 2020/0025149 | A1 | 1/2020 | Hrach et al. |
| 2020/0052552 | A1 | 2/2020 | Husband et al. |
| 2020/0080495 | A1 | 3/2020 | Leque et al. |
| 2020/0088105 | A1 | 3/2020 | Venter et al. |
| 2020/0094977 | A1 | 3/2020 | Patel et al. |
| 2020/0102892 | A1 | 4/2020 | Polly et al. |
| 2020/0109685 | A1 | 4/2020 | Kupratis et al. |
| 2020/0182158 | A1 | 6/2020 | Kupratis |
| 2020/0263614 | A1 | 8/2020 | Oyama et al. |
| 2020/0284201 | A1 | 9/2020 | Gebhard et al. |
| 2021/0172384 | A1 | 6/2021 | Brown et al. |
| 2021/0222628 | A1* | 7/2021 | Devendorf ............. F02C 6/206 |
| 2021/0249978 | A1 | 8/2021 | Smith et al. |
| 2022/0205394 | A1 | 6/2022 | Kupratis et al. |

FOREIGN PATENT DOCUMENTS

| | | | |
|---|---|---|---|
| CN | 103998723 | A | 8/2014 |
| CN | 106061787 | A | 10/2016 |
| DE | 102012210242 | A1 | 12/2013 |
| DE | 102013209388 | A1 | 11/2014 |
| DE | 102013209538 | A1 | 11/2014 |
| EP | 0272180 | A2 | 6/1988 |
| EP | 2657457 | A2 | 10/2013 |
| EP | 2733312 | A2 | 10/2013 |
| EP | 2728141 | A2 | 5/2014 |
| EP | 2962885 | A1 | 1/2016 |
| GB | 1097632 | A | 1/1968 |
| JP | S59200598 | A | 11/1984 |
| JP | H02161135 | A | 6/1990 |
| JP | H02164695 | A | 6/1990 |
| JP | 2011/012675 | A | 1/2011 |

OTHER PUBLICATIONS

Cyders, Analysis and Experimental Comparison of Models of a New Form of Continuously Variable Transmission, PHD Thesis, Russ College of Engineering and Technology, Ohio University, Dec. 2012, 171 Pages.

FAA, Airplane Turbofan Engine Operation and Malfunctions Basic Familiarization for Flight Crews, 2006, Chapter 1, pp. 1-38, Retrieved from https://web.archive.org/web/20061001012449/https://www.faa.gov/aircraft/air_cert/design_approvals/engine_prop/media/engine_malf_famil.doc Dec. 10, 2018 (Year 2006), 38 Pages.

Gazzaniga et al., Wind Tunnel Performance Results of Swiri Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 (MDM. 092) Dec. 21, 2015., 96 Pages.

Schneider, Clad in Controversy, IEEE Spectrum, Aug. 2013, 38 Pages.

Zahringer, Towards the Powerhouse for More Electric Aircraft-Dedicated Engine Concepts, American Institute of Aeronautics and Astronautics, Inc., ISABE-2009-1166, 2009, pp. 1-7.

* cited by examiner

PROPULSION SYSTEM INCLUDING AN ELECTRIC MACHINE FOR STARTING A GAS TURBINE ENGINE

PRIORITY INFORMATION

The present application claims priority to Indian Patent Application Number 202211047645 filed on Aug. 22, 2022.

FIELD

This application is generally directed to a gas turbine engine including an electric machine.

BACKGROUND

Gas turbine engines are used as a power source for various applications, such as for aircraft propulsion. Gas turbine engines have many different configurations but commonly include a turbomachine and a rotor assembly. In the case of a turbofan engine, the rotor assembly may be configured as a ducted fan assembly driven by the turbomachine. In the case of a turboprop engine, the turbomachine may be operatively coupled with an exposed propeller that is rotated to produce thrust.

The turbomachine, sometimes referred to as a gas turbine or core turbine engine, generally includes a high-speed spool and a low-speed spool. A combustion section receives pressurized air, which is mixed with fuel and combusted within a combustion chamber to generate combustion gases. The combustion gases are provided first to a high-speed turbine of the high-speed spool, driving the high-speed spool, and subsequently to a low-speed turbine of the low-speed spool, driving the low-speed spool. The rotor assembly, or the propeller in the case of a turboprop engine, is typically coupled to the low-speed spool.

Improved systems and mechanisms for starting a gas turbine engine would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Figure 1:
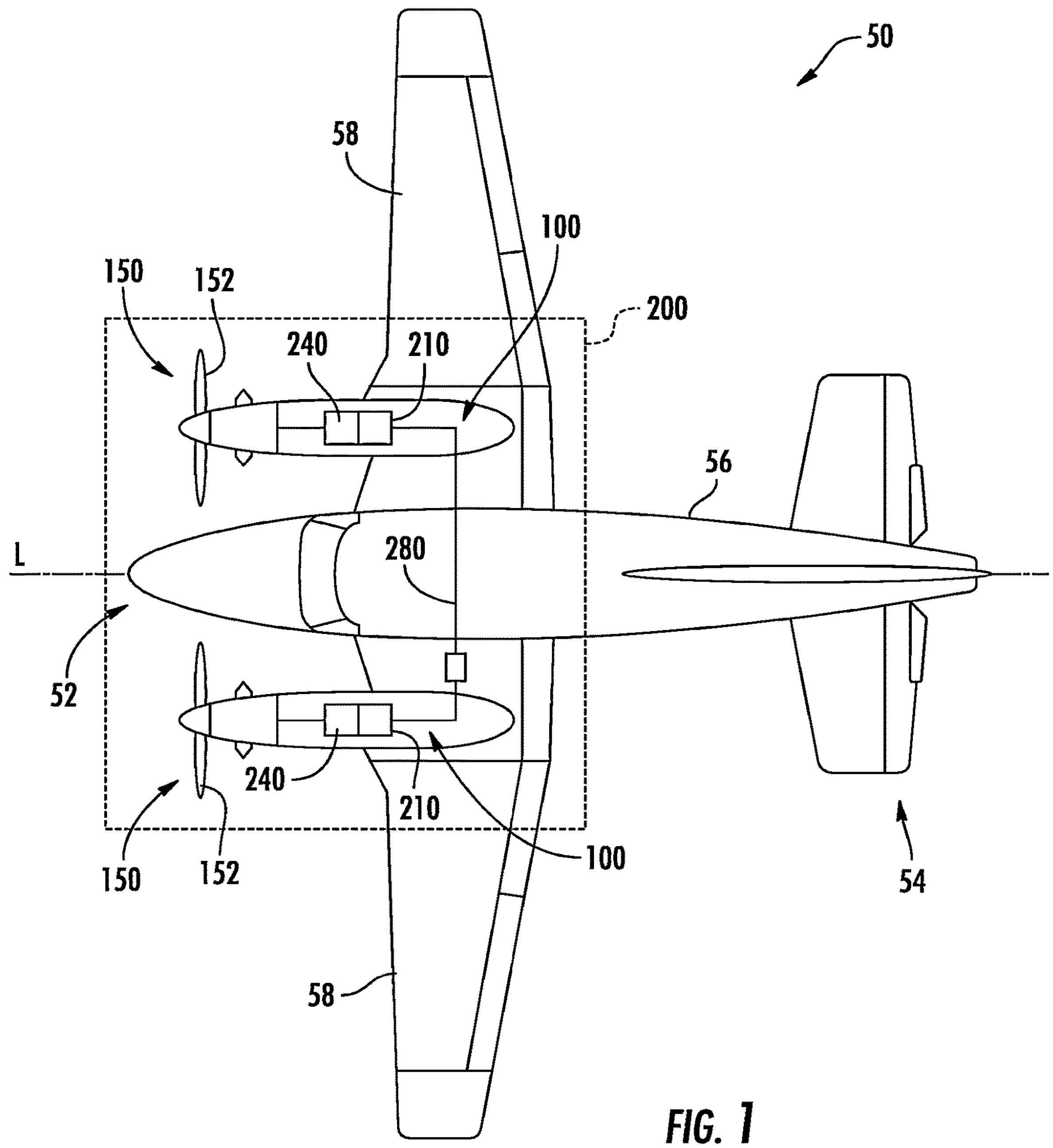
FIG. 1 provides a schematic top plan view of an aircraft according to an example embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

During startup of a gas turbine engine, a starting system including a starter motor may be used to accelerate the core to a predetermined speed after which sufficient core flow and pressure may be achieved to start ignition and result in steady engine operation. At this point, the starting system may be disengaged. However, this starting procedure can take a few minutes, and might also have reliability issues. For example, in some events the airflow passing through the turbomachine may not be sufficient to support engine operation. Accordingly, gas turbine engines may utilize an external motor or motor/generator that rotates the low pressure of the engine during startup to enable a faster and more reliable startup. Accordingly, a gas turbine engine having one or more features for improving engine startup would be useful. More specifically, a gas turbine engine having one or more features for faster and more reliable startups in both a cold start condition and in a relight situation (e.g., after an inflight shutdown) would be particularly beneficial and useful.

The subject matter of the present disclosure is directed generally to a hybrid electric configuration for a propulsion system comprising a gas turbine engine, such as a turboprop, that includes an electric motor coupled to a low-speed spool of the engine for providing propulsive power and also assisting during normal engine start or relights (e.g., in the event of an inflight shutdown). In addition, the hybrid configuration may include an accessory gear box and starter motor that are coupled to a high-speed spool of the engine and/or a clutch that selectively engages to interconnect the low-speed spool and the high-speed spool. In this manner, the hybrid configuration can reduce inertial lag between the spools during engine starts or relights. In addition, engine startups and relights may be quicker and more reliable. In this event of an inflight shutdown and subsequent relight, the relight envelope (e.g., the conditions when relight may be successfully performed) may be expanded. The electric motor may serve as a redundant system, i.e., as backup for accessory gearbox mounted starter-generator mechanisms. In addition, the presently disclosed configurations may facilitate or enable simultaneous left and right engine start capability and cross-feed start capability on ground/during inflight shutdown.

FIG. 1 provides a top plan schematic view of an exemplary aerial vehicle 50 having a hybrid electric propulsion system 200 in accordance with exemplary embodiments of the present disclosure. As shown, for this embodiment, the aerial vehicle 50 is a fixed-wing aircraft. In other embodiments, the aerial vehicle 50 may be other suitable types of aerial vehicles, such as a rotary aircraft, a vertical take-off and landing aircraft, tiltrotors, airships, unmanned aerial vehicles, etc. The aerial vehicle 50 extends between a first end 52 and a second end 54, e.g., along a longitudinal axis L. The first end 52 is a forward end of the aerial vehicle 50 and the second end 54 is a rear or aft end of the aerial vehicle 50 in the depicted embodiment of FIG. 1.

The aerial vehicle 50 includes a fuselage 56 and a pair of wings 58 each extending laterally outward from the fuselage 56. The aerial vehicle 50 may include various control surfaces for controlling propulsion and movement of the aerial vehicle 50. Example control surfaces include elevators, rudders, ailerons, spoilers, flaps, slats, air brakes, or trim devices, etc. Various actuators, servo motors, and other devices may be used to manipulate the various control surfaces and variable geometry components of the aerial vehicle 50. Moreover, as noted above, the aerial vehicle 50 includes the hybrid electric propulsion system 200 for producing thrust. More particularly, for this embodiment, the hybrid electric propulsion system 200 may be a parallel hybrid electric propulsion system, a series hybrid electric propulsion system, a series-parallel hybrid electric propulsion system, or any other hybrid propulsion configuration.

As depicted in FIG. 1, the hybrid electric propulsion system 200 includes one or more engines 100 mounted to the wings 58 of the aerial vehicle 50. Each engine 100 may be any suitable aeromechanical torque source. For instance, the engine 100 is a gas turbine engine in the depicted embodiment. The gas turbine engine may be configured as a turboprop (as shown in FIG. 1), or other suitable types of gas turbine engines, e.g., turbofans, turbojets, turboshaft, etc. In alternative embodiments, the engine 100 may be a piston-driven engine or some other type of internal combustion engine, such as a rocket engine. Moreover, in some embodiments, the aerial vehicle 50 can include a single engine or more than two engines.

Figure 2:
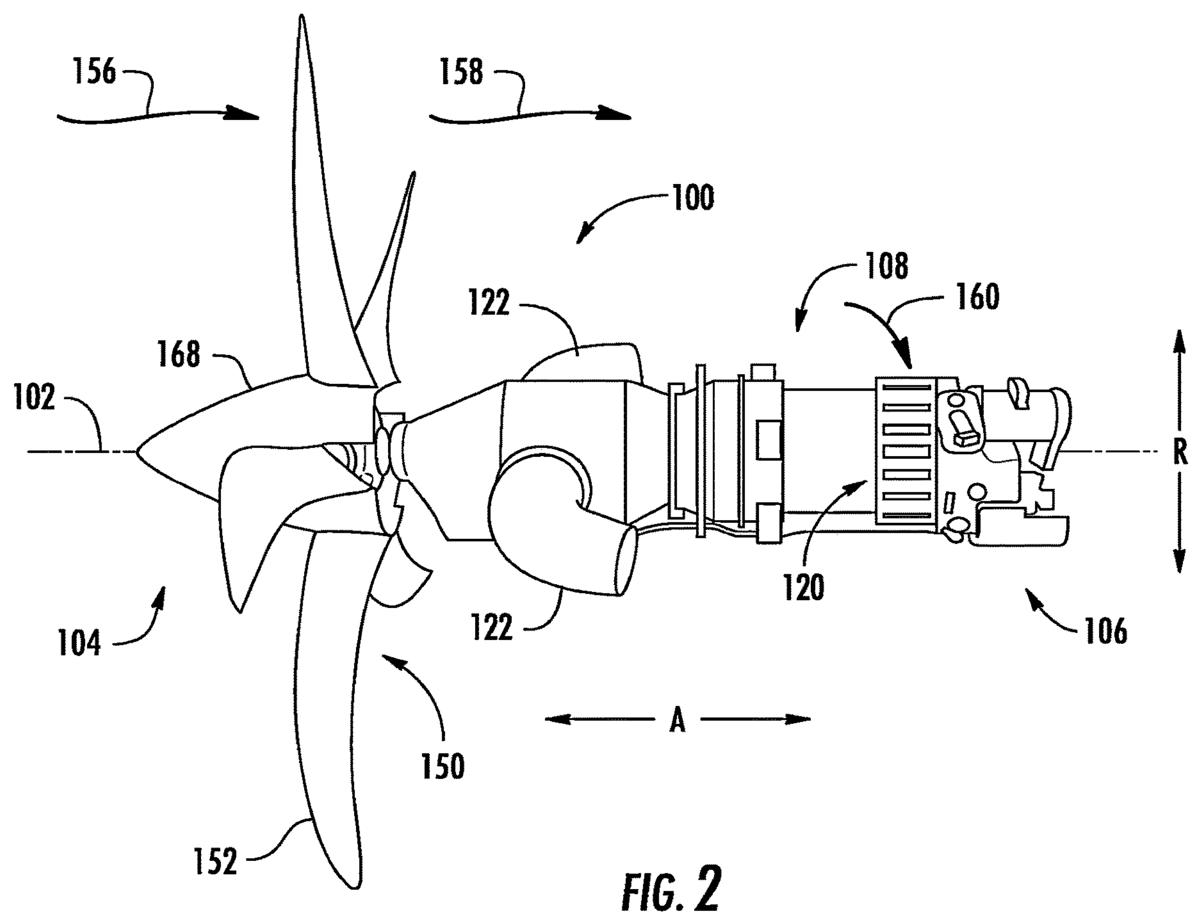
FIG. 2 provides a side view of a gas turbine engine of the exemplary aircraft of FIG. 1 according to an example embodiment of the present subject matter.
Figure 3:
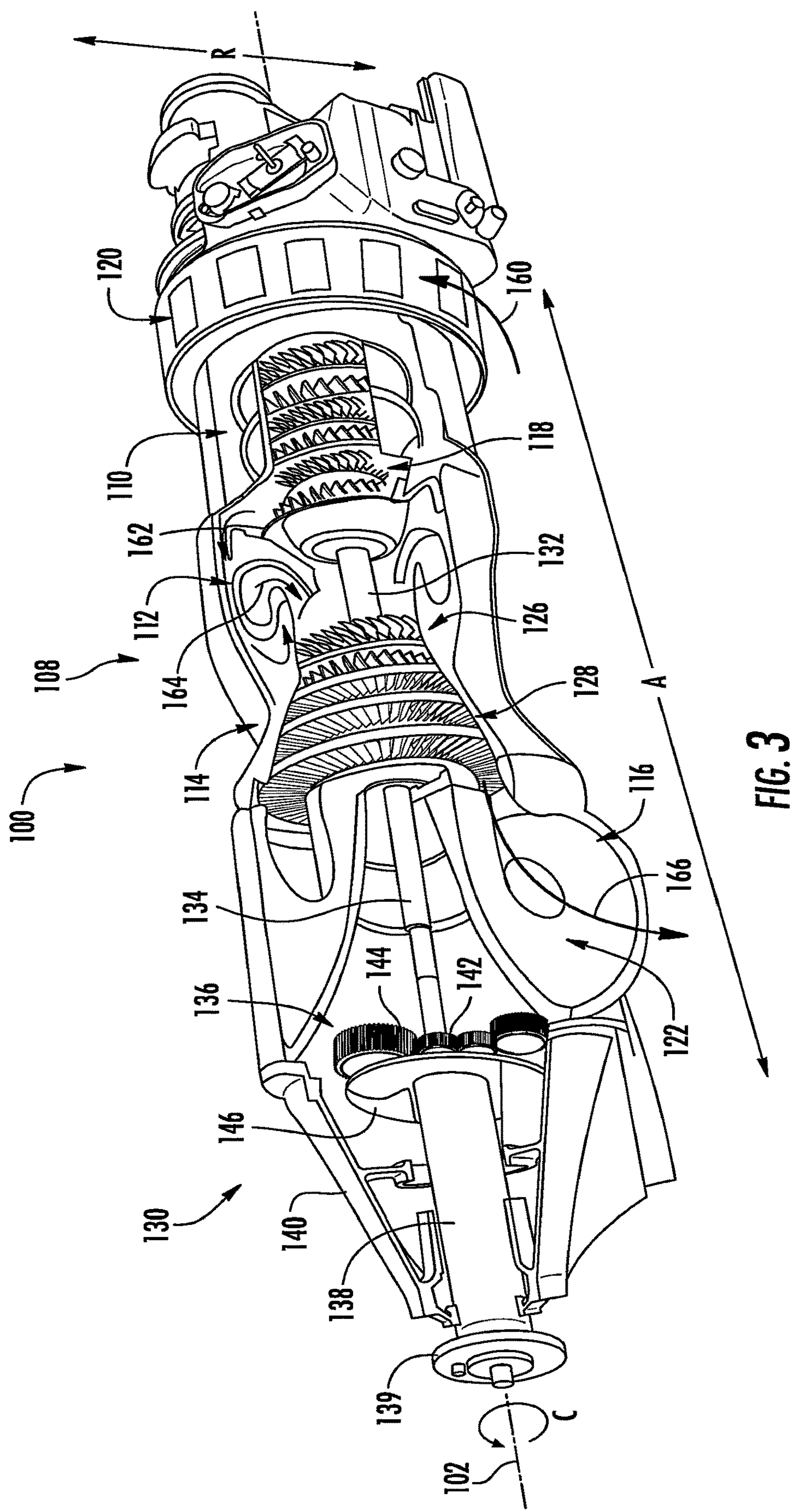
FIG. 3 provides a perspective, cutaway view of the exemplary gas turbine engine of FIG. 2 according to an example embodiment of the present subject matter.

FIGS. 2 and 3 provide various views of the engine 100 of the aerial vehicle 50 of FIG. 1. Particularly, FIG. 2 provides a side view of the engine 100 and FIG. 3 provides a perspective, cutaway view of the engine 100. For reference, the gas turbine engine 100 defines an axial direction A, a radial direction R, and a circumferential direction C (FIG. 3) extending three hundred sixty degrees (360°) around the axial direction A. The gas turbine engine 100 also defines a longitudinal or axial centerline 102 extending along the axial direction A. The gas turbine engine 100 extends generally along the axial direction A between a first end 104 and a second end 106, which for this embodiment is the forward and aft end, respectively.

Generally, the gas turbine engine 100 includes a gas generator or turbomachine 108. As shown in FIG. 3, the turbomachine 108 generally includes, in serial flow arrangement, a compressor section 110, a combustion section 112, a turbine section 114, and an exhaust section 116. A core air flowpath 118 extends from an annular inlet 120 to one or more exhaust outlets 122 of the exhaust section 116 such that the compressor section 110, combustion section 112, turbine section 114, and exhaust section 116 are in fluid communication.

The compressor section 110 can include one or more compressors, such as a high pressure compressor (HPC) and a low pressure compressor (LPC). For this embodiment, the compressor section 110 includes a four-stage axial, single centrifugal compressor. In particular, the compressor includes sequential stages of compressor stator vanes and rotor blades (not labeled), as well as an impeller (not labeled) positioned downstream of the axial stages of stator vanes and rotor blades. The combustion section 112 includes a reverse-flow combustor (not labeled) and one or more fuel nozzles (not shown). The turbine section 114 can define one or more turbines, such as a high pressure turbine (HPT) and a low pressure turbine (LPT). For this embodiment, the turbine section 114 includes a two-stage HPT 126 for driving the compressor of the compressor section 110. The HPT 126 includes two sequential stages of stator vanes and turbine blades (not labeled). The turbine section 114 also includes a three-stage free or power turbine 128 that drives a propeller gearbox 130, which in turn drives the propeller assembly 150 (FIG. 2). The exhaust section 116 includes one or more exhaust outlets 122 for routing the combustion products to the ambient air.

Referring still to FIG. 3, the turbomachine 108 can include one or more shafts. For this embodiment, the gas turbine engine 100 includes a compressor shaft 132 and a free or power shaft 134. The compressor shaft 132 drivingly couples the turbine section 114 with the compressor section 110 to drive the rotational components of the compressor. The power shaft 134 drivingly couples the power turbine 128 to drive a gear train 136 of the propeller gearbox 130, which in turn operatively supplies power and torque to the propeller 150 (FIG. 2) via a torque output or propeller shaft 138 at a reduced number of revolutions per minute (RPM). The forward end of the propeller shaft 138 includes a flange 139 that provides a mounting interface for the propeller assembly 150 to be attached to the turbomachine 108.

The propeller gearbox 130 is enclosed within a gearbox housing 140. For this embodiment, the housing 140 encloses the epicyclical gear train 136 that includes a star gear 142 and a plurality of planetary gears 144 disposed about the star gear 142. The planetary gears 144 are configured to revolve around the star gear 142. An annular gear 146 is positioned axially forward of the star and planetary gears 142, 144. As the planetary gears 144 rotate about the star gear 142, torque and power are transmitted to the annular gear 146. As shown, the annular gear 146 is operatively coupled to or otherwise integral with the propeller shaft 138. In some embodiments, the gear train 136 may further include additional planetary gears disposed radially between the plurality of planetary gears 144 and the star gear 142 or between the plurality of planetary gears 144 and the annular gear 146. In addition, the gear train 136 may further include additional annular gears.

As noted above, the turbomachine 108 transmits power and torque to the propeller gearbox 130 via the power shaft 134. The power shaft 134 drives the star gear 142, which in turn drives the planetary gears 144 about the star gear 142. The planetary gears 144 in turn drive the annular gear 146, which is operatively coupled with the propeller shaft 138. In this way, the energy extracted from the power turbine 128 supports operation of the propeller shaft 138, and through the power gear train 136, the relatively high RPM of the power shaft 134 is reduced to a more suitable RPM for the propeller 150.

As explained above, turbomachine 108 is operatively coupled with a propeller 150. For instance, the propellers 150 can be mechanically coupled to a front of engine 100, e.g., as shown in FIG. 2 via flange 139 as shown in FIG. 3. As explained above, turbine section 114 may include power turbine 128 that drives a propeller gearbox 130, which in turn drives the propeller assembly 150 (FIG. 2). It should be appreciated the propeller 150 may be coupled to turbomachine 108 in any other suitable manner while remaining within the scope of the present subject matter.

Generally, each propeller 150 is configured to produce thrust when driven by the engine 100. The propellers 150 include a plurality of propeller blades 152. In some embodiments, the blades 152 of the propeller 150 are adjustable in unison through a plurality of blade pitch angles, e.g., by activation of an actuation mechanism. Pitch adjustment of the blades 152 can cause the propeller 150 to produce more or less thrust depending on the blade angle of the blades 152. The propeller 150 and various components of the turbomachine 108 are rotatable about the axial centerline 102, or more generally, the axial direction A.

With reference to FIG. 2, during operation of the gas turbine engine 100, a volume of air indicated by arrow 156 passes across the plurality of propeller blades 152 circumferentially spaced apart from one another along the circumferential direction C and disposed about the axial direction A, and more particularly for this embodiment, the axial centerline 102. The propeller assembly 150 includes a spinner 168 aerodynamically contoured to facilitate an airflow through the plurality of propeller blades 152. The spinner 168 is rotatable with the propeller blades 152 about the axial direction A and encloses various components of the propeller assembly 150, such as e.g., the hub, propeller pitch actuator, piston/cylinder actuation mechanisms, etc. A first portion of air indicated by arrow 158 is directed or routed outside of the turbomachine 108 to provide propulsion. A second portion of air indicated by arrow 160 is directed or routed through the annular inlet 120 of the gas turbine engine 100.

As shown in FIG. 3, the second portion of air 160 enters through the annular inlet 120 and flows downstream to the compressor section 110, which is a forward direction along the axial direction A in this embodiment. The second portion of air 160 is progressively compressed as it flows through the compressor section 110 downstream toward the combustion section 112.

The compressed air indicated by arrow 162 flows into the combustion section 112 where fuel is introduced, mixed with at least a portion of the compressed air 162, and ignited to form combustion gases 164. The combustion gases 164 flow downstream into the turbine section 114, causing rotary members of the turbine section 114 to rotate, which in turn supports operation of respectively coupled rotary members in the compressor section 110 and propeller assembly 150. In particular, the HPT 126 extracts energy from the combustion gases 164, causing the turbine blades to rotate. The rotation of the turbine blades of the HPT 126 causes the compressor shaft 132 to rotate, and as a result, the rotary components of the compressor are rotated about the axial direction A. In a similar fashion, the power turbine 128 extracts energy from the combustion gases 164, which causes the blades of the power turbine 128 to rotate about the axial direction A. The rotation of the turbine blades of the power turbine 128 causes the power shaft 134 to rotate, which in turn drives the power gear train 136 of the propeller gearbox 130.

The propeller gearbox 130 in turn transmits the power provided by the power shaft 134 to the propeller shaft 138 at a reduced RPM and desired amount of torque. The propeller shaft 138 in turn drives the propeller assembly 150 such that the propeller blades 152 rotate about the axial direction A, and more particularly for this embodiment, the axial centerline 102 of the gas turbine engine 100. The exhaust gases, denoted by 166, exit the turbomachine 108 through the exhaust outlets 122 to the ambient air.

It should be appreciated that the example gas turbine engine 100 described herein is provided by way of example only. For example, in other example embodiments, the engine may include any suitable number or types of compressors, turbines, shafts, stages, etc. Additionally, in some example embodiments, the gas turbine engine may include any suitable type of combustor, and may not include the example reverse-flow combustor depicted. It will further be appreciated that the engine can be configured as any suitable type of engine operatively coupled with a propeller. For instance, in some embodiments, the engine can be configured as a reciprocating or piston engine. In addition, it will be appreciated that the present subject matter can be applied to or employed with any suitable type of propeller or fan configuration, including, for example, tractor and pusher configurations.

Figure 4:
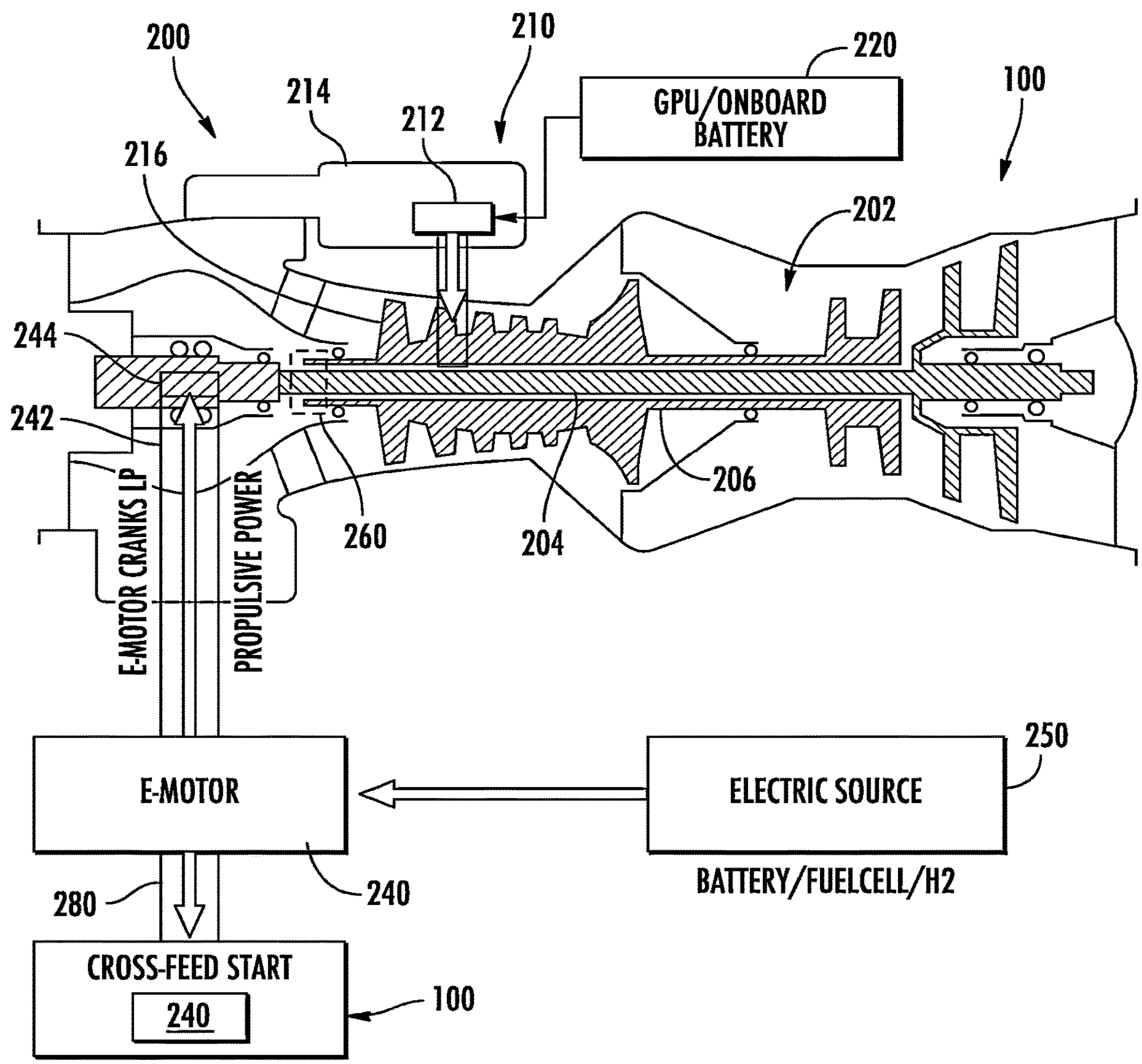
FIG. 4 provides a schematic view of the exemplary gas turbine engine of FIG. 2 coupled to an electric machine according to an example embodiment of the present subject matter.

Referring now also to FIG. 4, the hybrid electric propulsion system 200 will be described in more detail. As explained above, propulsion system 200 may generally include one or more gas turbine engines, e.g., such as gas turbine engine 100 illustrated in FIGS. 1 through 3. Specifically, as shown in FIG. 1, propulsion system 200 includes two gas turbine engines 100 (i.e., one positioned on each wing 58) each of which is operably coupled to a propeller 150 for providing thrust to aircraft 50. According to exemplary embodiments, propulsion system 200 may include auxiliary electrical support devices, as described in more detail below.

As shown in FIG. 4, gas turbine engine 100 may include a turbomachine 202 (e.g., may be the same or similar to or turbomachine 108). Turbomachine 202 may include a low pressure (LP) spool 204 and a high pressure (HP) spool 206 that rotate about a central axis (e.g., such as axial centerline 102). As explained in more detail below, aspects of hybrid electric propulsion system 200 are generally configured for supporting engine startup (e.g., starting gas turbine engine 100 prior to flight) and/or engine relight (e.g., restarting gas turbine engine 100 after shutdown or failure within flight).

Accordingly, in exemplary embodiments, propulsion system 200 or gas turbine engine 100 may include a starter assembly 210 that is mechanically coupled to the HP spool 206 for selectively rotating the HP spool 206, e.g., during engine startup. For example, starter assembly 210 may generally include a starter motor 212 and an accessory gearbox 214 that is coupled to the HP spool 206. Specifically, for example, starter motor 212 may be coupled to HP spool 206 through accessory gearbox 214.

According to exemplary embodiments, starter motor 212 may be coupled to the HP spool 206 of the turbomachine 202 through accessory gearbox 214. More specifically, the turbomachine 202 includes a gear train 216 coupled to the HP spool 206 at a connection point and extends into the accessory gearbox 214. In such a manner, the accessory gearbox 214 may transfer rotational power from starter motor 212 to HP spool 206 of the engine 100 during engine startup or relight.

Although operation of starter assembly 210 is described herein as being used in a motoring application, it should be appreciated that starter assembly 210 may also be used as a generator, e.g., for powering one or more accessory systems that are mechanically coupled to the accessory gearbox 214. In this manner, the accessory gearbox 214 may transfer rotational power from the HP spool 206 of the engine 100 to starter motor 212. Starter motor 212 converts the rotational energy received from HP spool 206 into electrical energy, which may be delivered to various components of engine 100, e.g., one or more accessory systems of the engine 100 or aircraft 50 incorporating the engine 100. Thus, the starter motor 212 may serve as an electric generator.

In general, starter assembly 210 may be electrically coupled to any suitable power supply for providing electrical power to operate starter motor 212 and rotate HP spool 206. For example, according to the illustrated embodiment, starter assembly 210 is electrically coupled with a starter power supply 220. More specifically, according to the illustrated embodiment of FIG. 4, starter power supply 220 is a direct current (DC) power supply, such as a ground power unit (GPU) or an onboard battery. During an engine start, starter motor 212 may draw power from starter power supply 220 and begin rotation of HP spool 206, e.g., via accessory gearbox 214.

In addition, propulsion system 200 may include an electric motor 240 that is mechanically coupled to the LP spool 204 for selectively rotating the LP spool 204. For example, electric motor 240 may be mechanically coupled to LP spool 204 through any suitable transmission or gearing arrangement. Specifically, according to the illustrated embodiment, electric motor 240 may be mechanically coupled to LP spool 204 through a driveshaft 242 and a gearbox 244.

Electric motor 240 may draw energy from any suitable power source. For example, according to exemplary embodiments, propulsion system 200 may include a motor power supply 250 that is electrically coupled to electric motor 240. More specifically, according to exemplary embodiments, motor power supply 250 may be a three-phase alternating current (AC) power supply. For example, motor power supply 250 may include a battery, a fuel-cell, a hydrogen-based power supply source, or any other electric power source.

Notably, according to exemplary embodiments, electric motor 240 is electrically decoupled or isolated from starter assembly 210. In this manner, electric motor 240 and starter assembly 210 may operate independently and/or simultaneously to selectively rotate LP spool 204 and HP spool 206, respectively.

Referring to FIG. 4, gas turbine engine 100 may further include a clutch assembly that is operably coupled to LP spool 204 and HP spool 206. For example, the clutch assembly may be an inter-spool clutch 260 that is generally configured for selectively engaging to transmit torque between LP spool 204 and HP spool 206. Specifically, inter-spool clutch 260 is positioned between the LP spool 204 and HP spool 206 to selectively couple the LP spool 204 to the HP spool 206 during certain operations, such as startup operations. This configuration may allow the starter assembly 210 and/or the electric motor 240 to be used to start, or assist with starting, the turbomachine 202. More specifically, for the embodiment shown in FIG. 4, the inter-spool clutch 260 is positioned between the LP spool 204 and the HP spool 206 at a location aligned with or positioned forward of the combustion section 112 along the axial direction A of the gas turbine engine 100, and aligned with or aft of a high speed compressor along the axial direction A. Such a configuration may allow for a balanced torque on the inter-spool clutch 260 when the inter-spool clutch 260 couples the LP spool 204 to the HP spool 206.

It will be appreciated, however, that in other embodiments, the inter-spool clutch 260 may be positioned at any other suitable location. For example, in other exemplary embodiments, as is depicted in phantom in FIG. 4, the inter-spool clutch 260 may be positioned at any suitable location forward of the combustion section 112, such as aligned with or positioned forward of a high speed compressor along the axial direction A, such as positioned forward of the high speed compressor along the axial direction A. Such a configuration may provide for a cooler inter-spool clutch 260 by virtue of its spacing from the combustion section 112, reducing a likelihood that the inter-spool clutch 260 prematurely wears.

During operation, the inter-spool clutch 260 may ensure that the low speed/low pressure system (LP spool 204) does not rotate faster than the high speed/high pressure system (HP spool 206) in a circumferential direction C. According to exemplary embodiments, the inter-spool clutch 260 may be a one-way clutch configured to passively engage and disengage depending on one or more operating conditions, such as a relative rotational speed and torque on the LP spool 204 and HP spool 206. However, it should be appreciated that according to alternative embodiments, inter-spool clutch 260 may be an actively controlled clutch.

For example, during starting operations, the starter motor 212 may receive electrical power through starter power supply 220, and convert such power to mechanical power that is transmitted through the accessory gearbox 214 and gear train 216 to the HP spool 206, rotating the HP spool 206 in the circumferential direction C. The inter-spool clutch 260 may be engaged by such rotation, such that the HP spool 206 correspondingly rotates the LP spool 204 (or vice versa) in the circumferential direction C across the inter-spool clutch 260.

Such operation may continue until the gas turbine engine 100 has reached a light-off point. As used herein, the term "light-off point" refers to a rotation speed wherein the LP spool 204 and/or HP spool 206 are rotating at a speed sufficient to provide an amount of airflow to the combustion section 112 to enable ignition of the combustion section 112 and sustained combustion. At this point, the combustion section 112 may generate combustion gases to drive the HP spool 206, and the HP spool 206 may have additional forces (from combustion gases) urging the HP spool 206 to rotate more quickly in the circumferential direction C than the LP spool 204. The inter-spool clutch 260 may be passively/automatically disengaged at this point, allowing for the HP spool 206 to rotate more quickly in the circumferential direction C than the LP spool 204.

As noted, the inter-spool clutch 260 may be configured as a one-way clutch. For example, it will be appreciated that in at least certain exemplary aspects, the inter-spool clutch 260 may be configured as a sprag clutch. Such a sprag clutch they include a plurality of sprags positioned between an inner race and an outer race. The inner race may be fixed to, or formed integrally with, the LP spool 204 and the outer race may be coupled to the HP spool 206. When the inner race rotates counterclockwise relative to the outer race, or when the outer race rotates more quickly than the inner race, the plurality of sprags provide substantially no resistance to such movement. By contrast, when the inner race attempts to rotate clockwise relative to the outer race (the circumferential direction C), the plurality of sprags rotate about each of their respective axes of rotation and lock the inner race to the outer race, such that no relative rotation of the inner race to the outer race in the clockwise direction is allowed.

It should be appreciated, however, that in other embodiments, any other suitable inter-spool clutch 260 may be utilized. For example, in other exemplary embodiments, the inter-spool clutch 260 may be an actively actuated, two step clutch, may be any other suitable form of one-way clutch, etc.

According to exemplary embodiments, propulsion system 200 may further include a controller 270 that is in operative communication with starter assembly 210, electric motor 240, inter-spool clutch 260, and other components of hybrid electric propulsion system 200 and/or gas turbine engine 100 for regulating system operation, e.g., during engine startup or relight. For example, according to an exemplary embodiment, controller 270 may be configured to operate electric motor 240 to rotate LP spool 204 and may simultaneously operate starter assembly 210 to rotate HP spool 206 during an engine startup procedure. In addition, according to exemplary embodiments, controller 270 may operate clutch assembly to engage or mechanically couple LP spool 204 and HP spool 206 during the engine startup procedure.

Although starter assembly 210 and electric motor 240 are described herein as being operated in parallel to drive HP spool 206 and LP spool 204, respectively, it should be appreciated that according to alternative embodiments, electric motor 240 may be used without starter assembly 210. For example, electric motor 240 may rotate LP spool 204 during an engine startup procedure and clutch assembly 260 may be engaged to also rotate HP spool 206 (with starter assembly 210 disengaged). In addition, it should be appreciated that electric motor 240 may be used for alternative purposes within hybrid electric propulsion system 200. For example, according to an exemplary embodiment, electric motor 240 may be mechanically coupled to an engine propeller (e.g., such as propeller 150) for selectively providing power to the rotating propeller 150 to provide thrust. In this regard, for example, the starter motor 212 may be utilized to accelerate propeller 150 more quickly during preflight operations. More specifically, electrical power may be provided to the electric motor 240 and converted to rotational power provided through the gearbox 244 to the LP spool 204 to directly assist with accelerating the propeller 150. In some embodiments, the propeller 150 is mechanically coupled with the engine 100 in parallel with the electric motor 240, e.g., to avoid single fault failures of the system. In alternative embodiments, the propeller 150 is mechanically coupled with the engine 100 in series with the electric motor 240.

Referring again to FIG. 1, aircraft 50 may include more than one gas turbine engine and the hybrid electric propulsion system 200 may include starter assemblies 210 and electric motors 240 for each engine. Accordingly, a first electric motor associated with a first gas turbine engine and a second electric motor associated with a second gas turbine engine may be operable simultaneously to start the first and second engines, thereby reducing the total startup time of aircraft 50. In addition, it should be appreciated that electric motors 240 from each gas turbine engine may be electrically coupled on a power bus 280. Accordingly, power may be transferred between engines to facilitate a cross-feed start. In this regard, for example, if one engine stops operating midflight and an engine restart is needed, power from the electric motor of the other engine may be transferred through power bus 280 to support operation of an electric motor for the engine that needs to be restarted. Propulsion system 200 may further include one or more power converters, conditioners, processing devices, semiconductor switches, energy storage devices, and/or other electronic components (not shown) coupled to power bus 280 for regulating or controlling the flow of electrical power.

Figure 5:
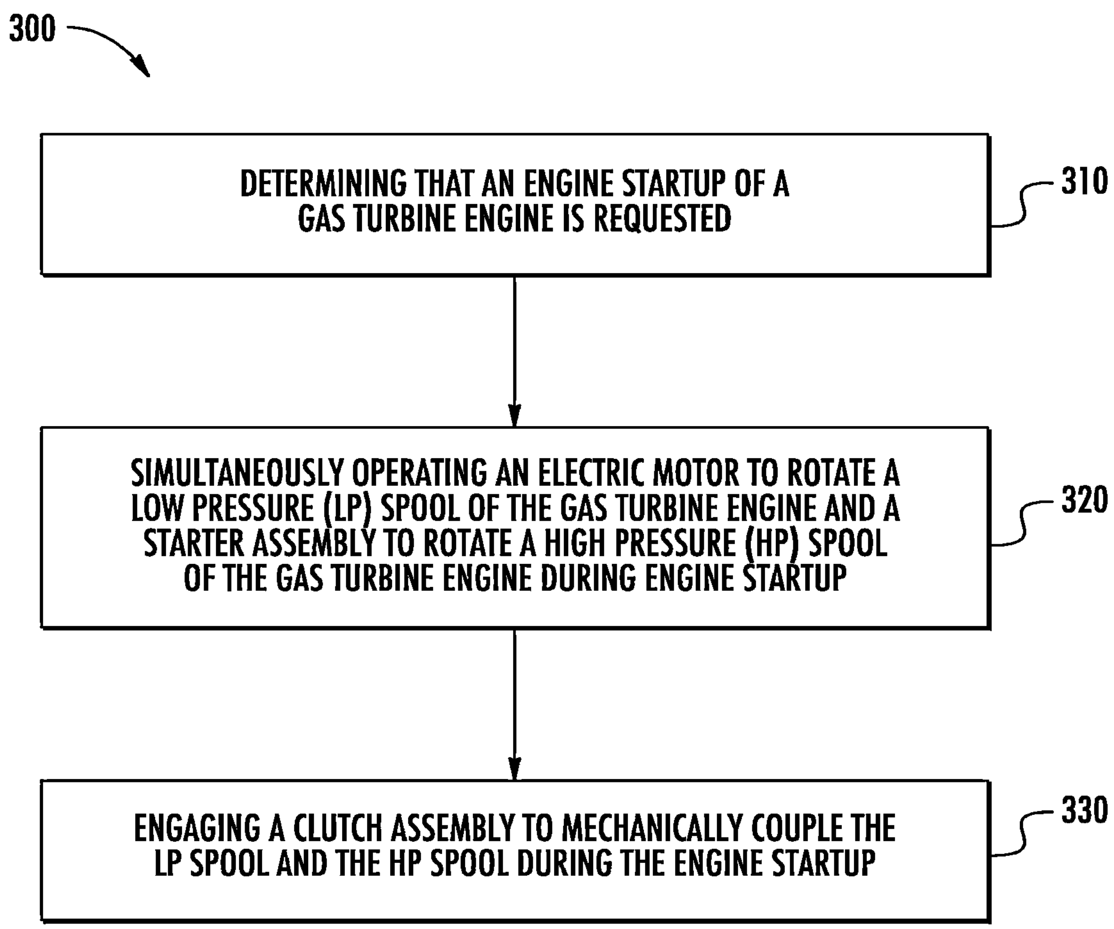
FIG. 5 provides a method of starting up a gas turbine engine in a hybrid electric configuration with an electric motor according to an example embodiment of the present subject matter.

FIG. 5 provides a flow diagram of an example method 300 for controlling gas turbine engine using a hybrid electric propulsion system. For instance, the method 300 can be implemented to control the engine 100 and/or propeller 150 of the vehicle 50 of FIG. 1. However, the method 300 can be implemented to control other engines operatively coupled with a propeller. Some or all of the method 300 can be implemented by hybrid electric propulsion system 200 disclosed herein. In addition, it will be appreciated that exemplary method 300 can be modified, adapted, expanded, rearranged and/or omitted in various ways without deviating from the scope of the present subject matter.

As shown, step 310 may include determining that an engine startup of a gas turbine engine is requested. In this regard, when aircraft 50 is on the tarmac and ready for departure, the pilot may provide a command to start up gas turbine engines 100. According to other embodiments, an engine may shut down for various reasons in flight and an engine restart or relight may be needed. Either situation may result in the need for an engine start.

Step 320 includes simultaneously operating an electric motor to rotate a low pressure spool (e.g., LP spool 204) of a gas turbine engine and a starter assembly to rotate a high pressure spool (e.g., HP spool 206) of the gas turbine engine during the engine startup procedure. In this regard, for example, starter assembly 210 may use starter motor 212 to apply torque via accessory gearbox 214 and gear train 216 to HP spool 206. Simultaneously, electric motor 240 may rotate driveshaft 242 and may apply torque to LP spool 204 via gearbox 244. In this manner, the lag between spools may be reduced or eliminated altogether in the speed of engine start may be improved. As explained above, according to exemplary embodiments, starter assembly 210 may not be needed for engine startup at all, such that propulsion system 200 relies on electric motor 240 to rotate LP spool 204 to facilitate engine startup, e.g., with assistance from inter-spool clutch 260 to rotate HP spool 206. Accordingly to still other embodiments, inter-spool clutch 260 may be omitted and electric motor 240 may induce sufficient airflow into turbomachine 202, enabling it to reach starting/light off speed without the need for starter assembly 210 and inter-spool clutch 260.

Step 330 includes engaging a clutch assembly to mechanically couple the LP spool and the HP spool during engine startup. In this regard, by coupling the rotation of LP spool 204 and HP spool 206 using inter-spool clutch 260, starter assembly 210 and electric motor 240 may operate together to rotate gas turbine engine 100 to the lighting speed. According to alternative embodiments, electric motor 240 may drive LP spool 204 and inter-spool clutch 260 may transmit torque to HP spool 206 without the need for starter assembly 210.

Figure 6:
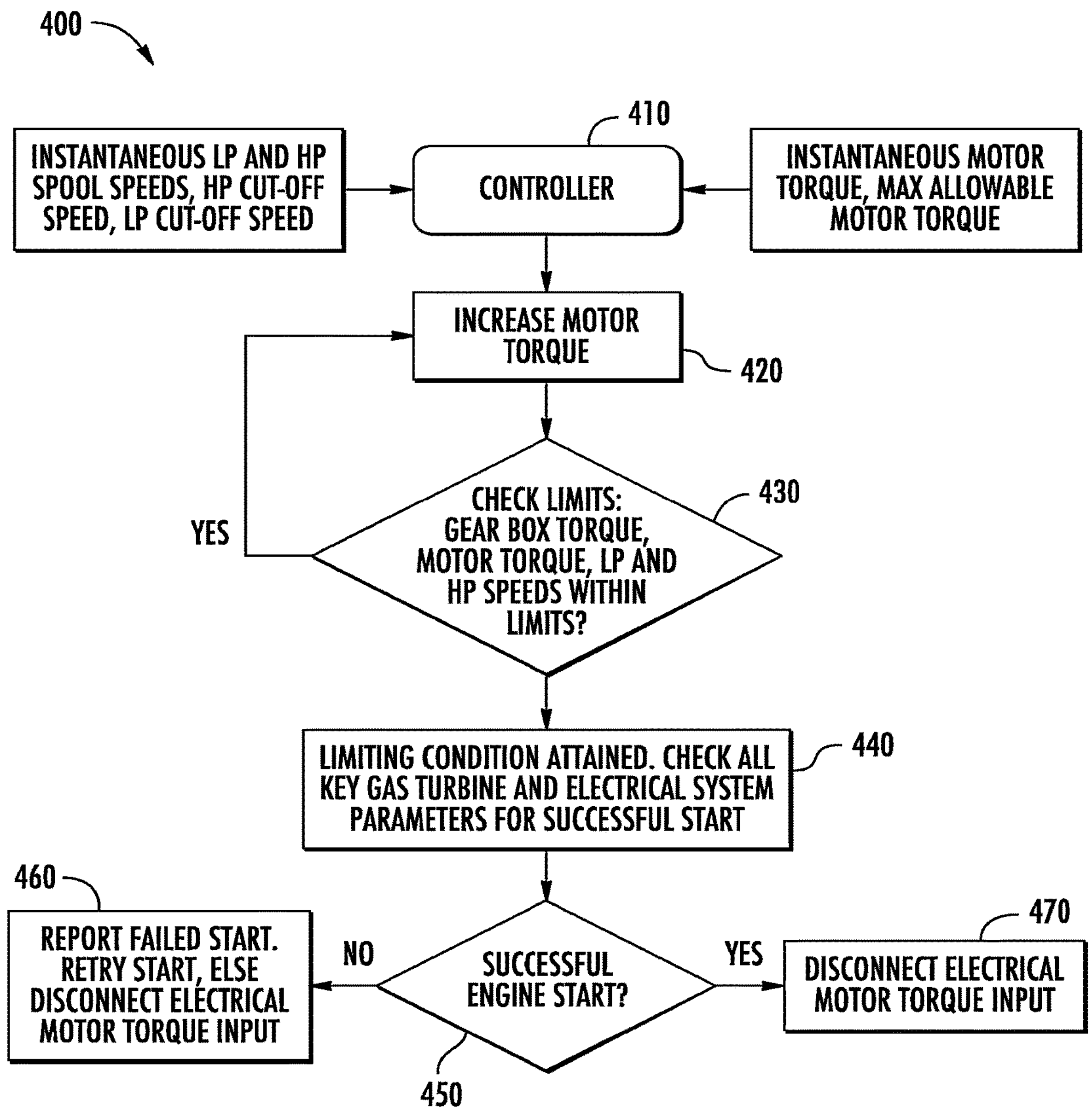
FIG. 6 provides a method of starting up a gas turbine engine in a hybrid electric configuration with an electric motor according to an example embodiment of the present subject matter.

Referring now to FIG. 6, a method 400 of starting up a gas turbine engine in a hybrid electric configuration with an electric motor according to an example embodiment of the present subject matter. For instance, the method 400 can be implemented to control the engine 100 and/or propeller 150 of the vehicle 50 of FIG. 1. However, the method 400 can be implemented to control other engines operatively coupled with a propeller. Some or all of the method 400 can be implemented by hybrid electric propulsion system 200 disclosed herein. In addition, it will be appreciated that exemplary method 400 can be modified, adapted, expanded, rearranged and/or omitted in various ways without deviating from the scope of the present subject matter.

As shown, step 410 includes receiving, at a system controller (e.g., such as computing system 500 discussed below), various engine operating parameters. According to an example embodiment, these operating parameters may include the instantaneous speed of the LP spool and the HP spool and corresponding spool cut-off speeds. In addition, the received engine operating parameters may include the instantaneous motor torque and/or the maximum allowable motor torque. Other engine operating parameters or system parameters may be obtained according to alternative embodiments, e.g., to facilitate implementation of method 400 and startup or operation of the gas turbine engine.

Step 420 may include increasing the motor torque of the electric machine during a startup or relight phase of the gas turbine engine. For example continuing the example from above, electric motor 240 may apply torque to LP spool 204 via gearbox 244 to begin rotation and ramp up the speed to a desired startup up or engine light speed desirable to support operation. Step 430 may include monitoring or checking engine operating limits. In this regard, for example, the controller may monitor gear box torque, motor torque, and/or the LP and HP spool speed to ensure that they are in limits. It should be appreciated that step 430 may include monitoring other parameters of the propulsion system as well. If operation is within limits, the electric machine may continue to apply torque and ramp up the speed of the engine toward the target speed. By contrast, if the limits checked at step 430 are reached or exceeded, step 440 may include checking all key gas turbine and electrical system parameters for a successful start. In this regard, for example, step 440 may include determining that the LP spool has reached a target speed associated with a successful engine start, e.g., sufficient to facilitate combustion and engine operation.

Step 450 includes determining whether there has been a successful engine start. If engine start was not successful, method 400 proceeds to step 460, where the failure is reported or the startup process is reinitiated or retried. If repeated startup failures have occurred, step 460 may include disconnecting the electric machine to prevent further torque application until the issue can be diagnosed and resolved. By contrast, if step 450 results in a determination that the gas turbine engine was successfully started, step 470 may include disconnecting the electric machine and not providing further torque to the gas turbine engine.

Figure 7:
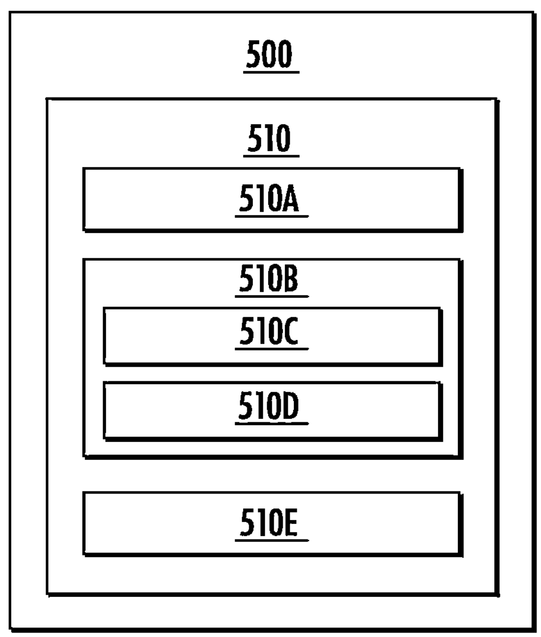
FIG. 7 provides an example computing system according to example embodiments of the present subject matter.

FIG. 7 provides an example computing system 500 according to example embodiments of the present subject matter. The computing system 500 can include one or more computing device(s) 510. For instance, one of the computing device(s) 510 can be the controller 270 described herein. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as e.g., operations for controlling the engine 100 (FIG. 1) and/or propeller 150 (FIG. 1) as described herein. Thus, the method 300 and/or method 400 can be implemented at least in part by the one or more computing device(s) 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of the various propeller speed thresholds, among other potential items or settings described herein.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as an external remote control, can be configured to receive one or more commands from the computing device(s) 510 or provide one or more commands to the computing device(s) 510.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

Further aspects are provided by the subject matter of the following clauses:

A gas turbine engine comprising: a turbomachine comprising a low pressure (LP) spool and a high pressure (HP) spool that rotate about a central axis; an electric motor mechanically coupled to the LP spool for selectively rotating the LP spool; a starter assembly mechanically coupled to the HP spool for selectively rotating the HP spool; and a controller in operative communication with the electric motor and the starter assembly, the controller being configured to operate the electric motor to rotate the LP spool and operate the starter assembly to rotate the HP spool during engine startup.

The gas turbine engine of any preceding clause, further comprising: a clutch assembly operably coupled to the LP spool and the HP spool, wherein the controller is in operative communication with the clutch assembly and is further configured to engage the clutch assembly to mechanically couple the LP spool and the HP spool during the engine startup.

The gas turbine engine of any preceding clause, wherein the clutch assembly is engaged while the electric motor and the starter assembly operate simultaneously.

The gas turbine engine of any preceding clause, wherein the electric motor is electrically coupled to a three-phase alternating current (AC) motor power supply.

The gas turbine engine of any preceding clause, wherein the motor power supply comprises a battery, a fuel cell, or an electric power supply source.

The gas turbine engine of any preceding clause, wherein the starter assembly comprises: a starter motor; and an accessory gearbox coupled to the HP spool, and wherein the starter motor is coupled to the HP spool through the accessory gearbox.

The gas turbine engine of any preceding clause, wherein the starter assembly is electrically coupled to a direct current (DC) starter power supply.

The gas turbine engine of any preceding clause, wherein the starter power supply comprises a ground power unit or onboard battery.

The gas turbine engine of any preceding clause, wherein the electric motor is electrically decoupled or isolated from the starter assembly.

The gas turbine engine of any preceding clause, wherein the gas turbine engine is a first engine of a propulsion system for an aircraft, wherein the electric motor is electrically coupled with a second engine of the propulsion system for selectively providing power during an engine startup of the second engine.

The gas turbine engine of any preceding clause, wherein the gas turbine engine is a first engine and the electric motor is a first electric motor of a propulsion system for an aircraft, wherein the propulsion system further comprises a second electric motor electrically coupled to a second engine of the propulsion system, and wherein the first electric motor and the second electric motor are operable to start the first engine and the second engine simultaneously.

The gas turbine engine of any preceding clause, further comprising: a propeller, wherein the electric motor is mechanically coupled to the propeller for selectively providing power for rotating the propeller.

The gas turbine engine of any preceding clause, wherein the gas turbine engine is a turboprop engine.

A hybrid electric propulsion system for an aircraft comprising a gas turbine engine, the gas turbine engine comprising a low pressure (LP) spool and a high pressure (HP) spool that rotate about a central axis, the hybrid electric propulsion system comprising: an electric motor mechanically coupled to the LP spool for selectively rotating the LP spool; a starter assembly mechanically coupled to the HP spool for selectively rotating the HP spool; and a controller in operative communication with the electric motor and the starter assembly, the controller being configured to operate the electric motor to rotate the LP spool and operate the starter assembly to rotate the HP spool during engine startup.

The hybrid electric propulsion system of any preceding clause, further comprising: a clutch assembly operably coupled to the LP spool and the HP spool, wherein the controller is in operative communication with the clutch assembly and is further configured to engage the clutch assembly to mechanically couple the LP spool and the HP spool during the engine startup.

The hybrid electric propulsion system of any preceding clause, wherein the electric motor is electrically coupled to a three-phase alternating current (AC) motor power supply and the starter assembly is electrically coupled to a direct current (DC) starter power supply.

A method of operating a gas turbine engine, the gas turbine engine comprising a low pressure (LP) spool and a high pressure (HP) spool that rotate about a central axis, an electric motor mechanically coupled to the LP spool for selectively rotating the LP spool, and a starter assembly mechanically coupled to the HP spool for selectively rotating the HP spool, the method comprising: determining that an engine startup is requested; and simultaneously operating the electric motor to rotate the LP spool and the starter assembly to rotate the HP spool during engine startup.

The method of any preceding clause, wherein the gas turbine engine further comprises a clutch assembly operably coupled to the LP spool and the HP spool, the method further comprising: engaging the clutch assembly to mechanically couple the LP spool and the HP spool during the engine startup.

The method of any preceding clause, wherein the gas turbine engine is a first engine of a hybrid electric propulsion system for an aircraft, wherein the electric motor is electrically coupled with a second engine of the hybrid electric propulsion system, the method further comprising: selectively providing power to the second engine during an engine startup of the second engine.

The method of any preceding clause, wherein the gas turbine engine is a first engine and the electric motor is a first electric motor of a hybrid electric propulsion system for an aircraft, wherein the hybrid electric propulsion system further comprises a second electric motor electrically coupled to a second engine of the hybrid electric propulsion system, the method further comprising: operating the first electric motor and the second electric motor to start the first engine and the second engine simultaneously.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:

a turbomachine comprising a combustion section, a low pressure (LP) spool, a low speed compressor, a high pressure (HP) spool, and a high speed compressor;

an electric motor mechanically coupled to the LP spool via a gearbox for selectively rotating the LP spool;

a starter assembly mechanically coupled to the HP spool at a connection point for selectively rotating the HP spool;

a controller in operative communication with the electric motor and the starter assembly, the controller being configured to operate the electric motor to rotate the LP spool and operate the starter assembly to rotate the HP spool during engine startup; and a clutch assembly positioned between and operably coupled to the LP spool and the HP spool at a location forward of the combustion section and aft of the high speed compressor, wherein the controller is in operative communication with the clutch assembly and is further configured to engage the clutch assembly to mechanically couple the LP spool and the HP spool during the engine startup, wherein the clutch is positioned axially between the gearbox and the connection point.

2. The gas turbine engine of claim 1, wherein the clutch assembly is engaged while the electric motor and the starter assembly operate simultaneously.

3. The gas turbine engine of claim 1, wherein the electric motor is electrically coupled to a three-phase alternating current (AC) motor power supply.

4. The gas turbine engine of claim 3, wherein the motor power supply comprises a fuel cell.

5. The gas turbine engine of claim 1, wherein the starter assembly comprises:

a starter motor; and an accessory gearbox coupled to the HP spool, and wherein the starter motor is coupled to the HP spool through the accessory gearbox.

6. The gas turbine engine of claim 1, wherein the starter assembly is electrically coupled to a direct current (DC) starter power supply.

7. The gas turbine engine of claim 6, wherein the starter power supply comprises a ground power unit or onboard battery.

8. The gas turbine engine of claim 1, wherein the electric motor is electrically decoupled or isolated from the starter assembly.

9. The gas turbine engine of claim 1, wherein the gas turbine engine is a first engine of a propulsion system for an aircraft, wherein the electric motor is electrically coupled with a second engine of the propulsion system for selectively providing power during an engine startup of the second engine.

10. The gas turbine engine of claim 1, wherein the gas turbine engine is a first engine and the electric motor is a first electric motor of a propulsion system for an aircraft, wherein the propulsion system further comprises a second electric motor electrically coupled to a second engine of the propulsion system, and wherein the first electric motor and the second electric motor are operable to start the first engine and the second engine simultaneously.

11. The gas turbine engine of claim 1, further comprising:

a propeller, wherein the electric motor is mechanically coupled to the propeller for selectively providing power for rotating the propeller.

12. The gas turbine engine of claim 1, wherein the gas turbine engine is a turboprop engine.

13. A hybrid electric propulsion system for an aircraft comprising a gas turbine engine, the gas turbine engine comprising a combustion section and a low pressure (LP) spool, a low speed compressor, a high pressure (HP) spool, and a high speed compressor, the hybrid electric propulsion system comprising:

an electric motor mechanically coupled to the LP spool via a gearbox for selectively rotating the LP spool;

a starter assembly mechanically coupled to the HP spool at a connection point for selectively rotating the HP spool;

a controller in operative communication with the electric motor and the starter assembly, the controller being configured to operate the electric motor to rotate the LP spool and operate the starter assembly to rotate the HP spool during engine startup; and a clutch assembly positioned between and operably coupled to the LP spool and the HP spool at a location forward of the combustion section and aft of the high speed compressor, wherein the controller is in operative communication with the clutch assembly and is further configured to engage the clutch assembly to mechanically couple the LP spool and the HP spool during the engine startup, wherein the clutch is positioned axially between the gearbox and the connection point.

14. The hybrid electric propulsion system of claim 13, wherein the electric motor is electrically coupled to a three-phase alternating current (AC) motor power supply and the starter assembly is electrically coupled to a direct current (DC) starter power supply.

15. A method of operating a gas turbine engine, the gas turbine engine comprising a turbomachine comprising a low pressure (LP) spool, a low speed compressor, a high pressure (HP) spool, a high speed compressor, and a combustion section, an electric motor mechanically coupled to the LP spool via a gearbox for selectively rotating the LP spool, a starter assembly mechanically coupled to the HP spool at a connection point for selectively rotating the HP spool, a controller in operative communication with the electric motor and the starter assembly, the controller being configured to operate the electric motor to rotate the LP spool and operate the starter assembly to rotate the HP spool during engine startup; and a clutch assembly positioned between and operably coupled to the LP spool and the HP spool at a location forward of the combustion section and aft of the high speed compressor, wherein the clutch is positioned axially between the gearbox and the connection point, the method comprising:

determining that an engine startup is requested;

wherein the controller is in operative communication with the clutch assembly and engaging the clutch assembly to mechanically couple the LP spool and the HP spool during the engine startup, and simultaneously operating the electric motor to rotate the LP spool and the starter assembly to rotate the HP spool during the engine startup.

16. The method of claim 15, wherein the gas turbine engine is a first engine of a hybrid electric propulsion system for an aircraft, wherein the electric motor is electrically coupled with a second engine of the hybrid electric propulsion system, the method further comprising:

selectively providing power to the second engine during an engine startup of the second engine.

17. The method of claim 15, wherein the gas turbine engine is a first engine and the electric motor is a first electric motor of a hybrid electric propulsion system for an aircraft, wherein the hybrid electric propulsion system further comprises a second electric motor electrically coupled to a second engine of the hybrid electric propulsion system, the method further comprising:

operating the first electric motor and the second electric motor to start the first engine and the second engine simultaneously.

* * * * *